US009854177B2

(12) United States Patent
Harada

(10) Patent No.: US 9,854,177 B2
(45) Date of Patent: Dec. 26, 2017

(54) IMAGING APPARATUS

(71) Applicant: CANON KABUSHIKI KAISHA, Tokyo (JP)

(72) Inventor: Tomohiro Harada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/072,139

(22) Filed: Mar. 16, 2016

(65) Prior Publication Data
US 2016/0277655 A1 Sep. 22, 2016

(30) Foreign Application Priority Data

Mar. 18, 2015 (JP) .................................. 2015-055210

(51) Int. Cl.
*H04N 5/232* (2006.01)
*H04N 7/00* (2011.01)
*H04N 5/235* (2006.01)
*H04N 5/225* (2006.01)

(52) U.S. Cl.
CPC ......... *H04N 5/2353* (2013.01); *H04N 5/2258* (2013.01); *H04N 5/23238* (2013.01); *H04N 5/23245* (2013.01); *H04N 5/23251* (2013.01)

(58) Field of Classification Search
CPC ........... H04N 5/23238; H04N 5/23293; H04N 5/23216; H04N 5/2258; H04N 5/2254; H04N 5/772; H04N 5/23206; H04N 2/23212; H04N 5/23232; G06T 2207/20221; G06T 2207/10016
See application file for complete search history.

(56) References Cited

U.S. PATENT DOCUMENTS

| 2009/0284620 | A1* | 11/2009 | Lablans | H04N 5/775 348/231.3 |
| 2011/0234852 | A1* | 9/2011 | Ishida | H04N 5/225 348/231.99 |
| 2012/0075412 | A1* | 3/2012 | Miyamoto | G03B 35/00 348/36 |

FOREIGN PATENT DOCUMENTS

| JP | H0514751 A | 1/1993 |
| JP | H1169288 A | 3/1999 |

* cited by examiner

*Primary Examiner* — Trung Diep
(74) *Attorney, Agent, or Firm* — Canon U.S.A., Inc. IP Division

(57) ABSTRACT

An imaging apparatus combines images output from imaging units, and reduces such scenes that an image of a displaced subject is captured. The apparatus includes a driving unit that drives at least one imaging unit serving as a driving target among the imaging units, in predetermined driving modes, and a combining unit that combines pieces of image data acquired by the imaging units. The imaging units each include an imaging sensor in which photoelectric converters for converting light into an electrical signal are arranged in rows and columns. The driving unit divides a region for acquiring the image data into a plurality of regions each corresponding to a unit formed of one or more rows of the imaging sensor. The driving modes include a first driving mode in which the imaging unit serving as the driving target is sequentially switched for each exposure or readout of the unit.

10 Claims, 8 Drawing Sheets

IMAGING APPARATUS

BACKGROUND

Technical Field

The present disclosure relates to an imaging apparatus, and particularly relates to an imaging apparatus having a plurality of imaging units.

Description of the Related Art

There is a conventional imaging apparatus capable of capturing an image of a wide area by using a plurality of imaging units without using a fisheye lens. The imaging apparatus performs processing of combining images output from the respective imaging units. For example, Japanese Patent Application Laid-Open No. 5-014751 discusses a method for generating a panoramic image of a wide angle of view using a plurality of imaging apparatuses.

Further, Japanese Patent Application Laid-Open No. 11-069288 discusses a method for generating a panoramic image by connecting a plurality of images.

SUMMARY OF THE INVENTION

According to an aspect of the embodiments, an imaging apparatus has a plurality of imaging units each provided to acquire image data by capturing an image of a subject, and the imaging apparatus includes a driving unit configured to drive at least one imaging unit as a driving target among the plurality of imaging units, in a predetermined driving mode, and a combining unit configured to combine pieces of image data acquired by the imaging units, wherein the imaging units each include an imaging sensor in which photoelectric converters for converting light into an electrical signal are arranged in rows and columns, wherein the driving unit divides a region for acquiring the image data into a plurality of regions each corresponding to a unit formed of one or more rows of the imaging sensor, and wherein the driving modes include a first driving mode in which the imaging unit serving as the driving target is sequentially switched for each exposure or readout of the unit.

Further features of the disclosure will become apparent from the following description of exemplary embodiments with reference to the attached drawings.

DESCRIPTION OF THE EMBODIMENTS

Figure 1:
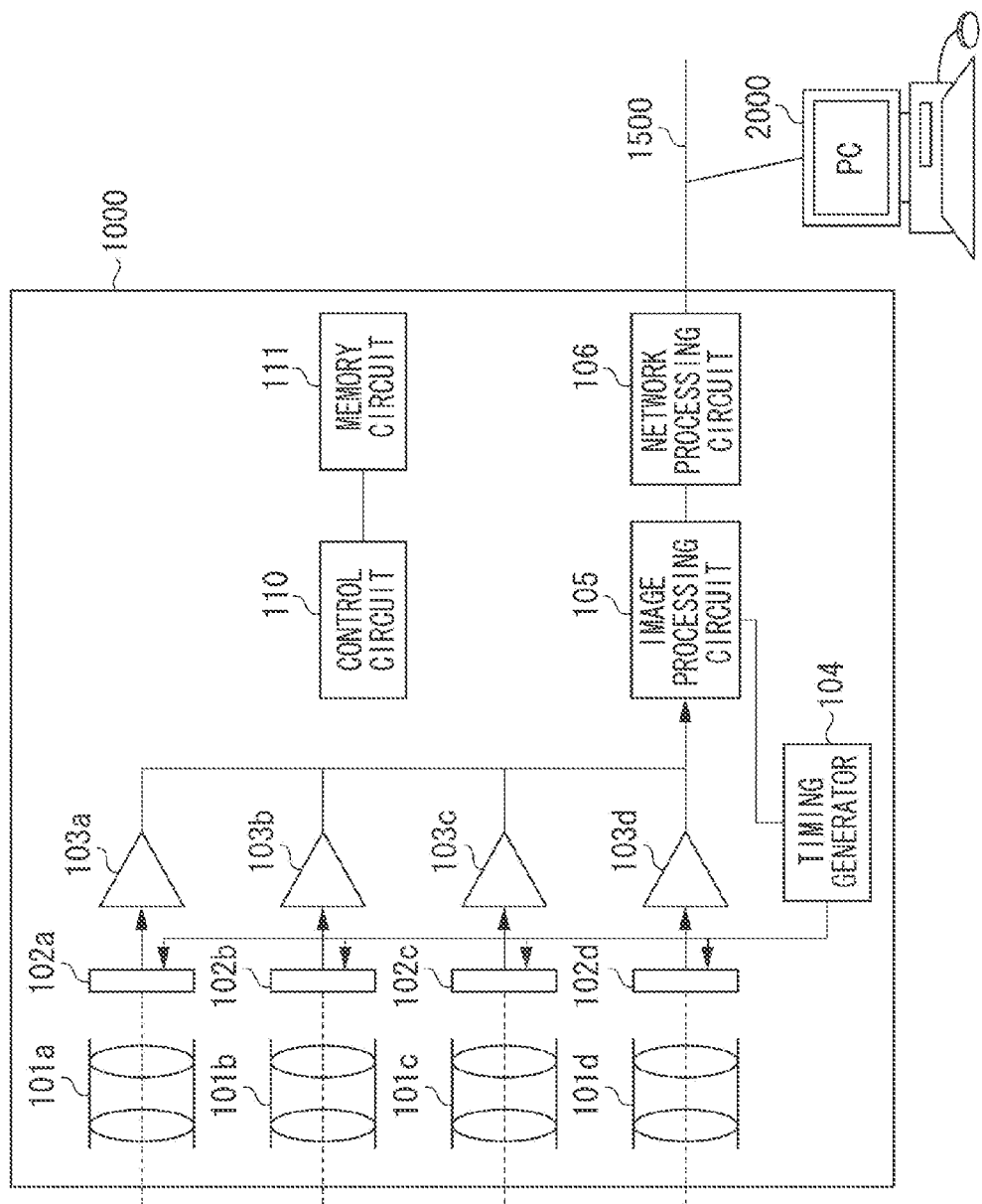
FIG. 1 is a diagram illustrating a system configuration according to a first exemplary embodiment.

Exemplary embodiments of the disclosure will be described in detail below with reference to the attached drawings. Any configuration to be described in the exemplary embodiments is only an example, and the disclosure is not limited to configurations illustrated in the drawings.

FIG. 1 is a diagram illustrating a system configuration including an imaging apparatus 1000 according to a first exemplary embodiment. A client apparatus 2000 represents an external apparatus in the present exemplary embodiment. The imaging apparatus 1000 and the client apparatus 2000 are connected to be capable of communicating with each other via a network 1500. The client apparatus 2000 transmits various control commands to the imaging apparatus 1000. The control commands include, for example, a command for starting or stopping image capture, and a command for causing a lighting device to emit light. When receiving each of the control commands, the imaging apparatus 1000 transmits a response to the received control command, and image data generated based on a captured image signal, to the client apparatus 2000.

The imaging apparatus 1000 according to the present exemplary embodiment is an example of an imaging apparatus that has a predetermined angle of view and captures an image of a subject. The imaging apparatus 1000 is, for example, a monitoring camera that captures a moving image. To be more specific, the imaging apparatus 1000 is a network camera used for monitoring. The client apparatus 2000 according to the present exemplary embodiment is an example of an external apparatus such as a personal computer (PC). A monitoring system including the imaging apparatus 1000 according to the present exemplary embodiment and the client apparatus 2000 corresponds to an imaging system.

The network 1500 is assumed to include one or more routers, switches, and cables compliant with a communication standard such as Ethernet (registered trademark). However, in the present exemplary embodiment, the communication standard, scale, and configuration may be of any type if these can allow the communication between the imaging apparatus 1000 and the client apparatus 2000.

The network 1500 may be, for example, configured of a network such as the Internet, a wired local area network (LAN), a wireless LAN, and a wide area network (WAN). The imaging apparatus 1000 according to the present exemplary embodiment may support, for example, Power over Ethernet (PoE (registered trademark)), and may be supplied with electric power via a LAN cable.

Next, an internal configuration of the imaging apparatus 1000 will be described with reference to FIG. 1. A lens group 101a includes components such as a zoom lens group, a focus lens group, and a stop mechanism, which are not illustrated.

An imaging sensor 102a is a sensor, in which photoelectric converters are arranged in rows and columns, such as a charge coupled device (CCD) imaging sensor and a complementary metal oxide semiconductor (CMOS) imaging sensor. The imaging sensor 102a converts an optical image received by an imaging sensor surface via the lens group 101a, into an electrical signal.

An amplifier 103a amplifies the signal output from the imaging sensor 102a into a predetermined signal level. The amplifier 103a according to the present exemplary embodiment has an analog-to-digital (A/D) conversion circuit. The amplifier 103a performs A/D conversion of the signal input from the imaging sensor 102a, and outputs a digital image signal resulting from the A/D conversion. In the present exemplary embodiment, the lens group 101a, the imaging sensor 102a, and the amplifier 103a are included in one imaging unit serving as a first imaging unit. The amplifier 103a is described to include the A/D conversion circuit, but the A/D conversion circuit may be provided in the imaging sensor 102a.

Similarly, a second imaging unit includes a lens group 101b, an imaging sensor 102b, and an amplifier 103b. A third imaging unit includes a lens group 101c, an imaging sensor 102c, and an amplifier 103c. A fourth imaging unit includes a lens group 101d, an imaging sensor 102d, and an amplifier 103d. These imaging units are set to be capable of capturing the respective images in different directions or of different areas. In the present exemplary embodiment, the four imaging units are disposed in such a manner that the respective imageable ranges are horizontally adjacent to each other.

A timing generator (hereinafter may be referred to as "TG") 104 generates a driving signal for driving each of the imaging sensors 102a to 102d, and outputs the driving signal to each of the respective imaging sensors 102a to 102d. The imaging sensors 102a to 102d each perform control such as exposure control and signal readout control, in synchronization with the timing based on the driving signal input by the TG 104. Specifically, in the present exemplary embodiment, the imaging sensors 102a to 102d each adopt line scan control for collectively performing operation such as reset and readout, row by row. The operation such as reset and readout is performed row by row, by sequentially switching one to another among the imaging sensors 102a to 102d. This will be described more in detail with reference to FIG. 2.

An image processing circuit 105 performs processing such as various kinds of graphic processing and compression encoding. The image processing circuit 105 sequentially receives signals switched line by line, from the imaging sensors 102a to 102d, and performs processing of sorting the signals into such a form that the images captured by the imaging sensors 102a to 102d are arranged according to the respective image-capture positions. Specifically, the image processing circuit 105 combines the arranged images into a composite panoramic image. Further, the image processing circuit 105 converts the composite image into image data, by performing, for example, image processing such as signal development processing, gamma processing, and noise reduction processing, on the composite image. The image data resulting from the conversion is subjected to compression encoding processing such as H.264 or H.265, and then output.

A network processing circuit 106 converts the output from the image processing circuit 105, in compliance with a communication protocol. The network processing circuit 106 then performs packet processing as appropriate, and distributes the results on the network 1500. In addition, the network processing circuit 106 transmits and receives a control signal for controlling the imaging apparatus 1000, in compliance with the communication protocol.

A control circuit 110 includes a central processing unit (CPU), and comprehensively performs, for example, control for each component of the imaging apparatus 1000 and setting of various parameters. A memory circuit 111 includes components such as a memory in which data is electrically erasable, and the control circuit 110 executes an operating system (OS) and various programs stored therein. The memory is used as an area such as a storage area for a program to be executed by the control circuit 110, a work area to be used during the execution of the program, and a data storage area. The control circuit 110 further includes a control unit for performing control to output a predetermined driving signal to the TG 104 at predetermined timing. For example, the TG 104 is controlled to change a driving mode for driving each of the imaging sensors 102a to 102d, based on an instruction from an apparatus such as the client apparatus 2000.

In addition, based on the control by the control circuit 110, the memory circuit 111 can hold a signal output from each of the amplifiers 103a to 103d and a signal output from the image processing circuit 105, in a predetermined order.

Here, in the present exemplary embodiment, the TG 104 and the image processing circuit 105 are each provided as one unit for each of the imaging units. Therefore, the TG 104 sequentially switches one serving as a driving target among the imaging sensors 102a to 102d to another, and sends the driving signal. The image processing circuit 105 sequentially processes the signals, which are input when being sequentially switched. In the present exemplary embodiment, the TG 104 and the image processing circuit 105 are each provided as one unit. However, either or each of the TG 104 and the image processing circuit 105 may be one or more. In this case, the number of simultaneously controllable imaging units can be increased and therefore, a frame rate, for example, can be increased.

Next, operation for changing exposure and readout of a plurality of imaging sensors by performing switching line by line will be described using a timing chart of FIG. 2. Imaging sensors A to D in FIG. 2 correspond to the imaging sensors 102a to 102d, respectively.

A vertical synchronizing signal 201 is generated in the TG 104, and then input into each of the imaging sensors A to D, as a reference signal for synchronization of driving timing for the imaging sensors A to D. The imaging sensors A to D each perform the processing based on the timing of a fall of the vertical synchronizing signal 201. In FIG. 2, exposure and readout of each row may be executed based on timing according to a horizontal synchronization signal not illustrated.

First, exposure (R11) for a first line of the imaging sensor A starts. At the next timing, exposure (R21) for a first line of the imaging sensor B starts. Subsequently, exposure R31 for a first line of the imaging sensor C and then exposure R41 for a first line of the imaging sensor D sequentially start. Afterward, exposure R12 for a second line of the imaging sensor A starts. In this way, in each target line of each of the imaging sensors A to D, the exposure of each of the imaging sensors A to D adjacent to each other in a scanning direction 206 sequentially starts. To each of the imaging sensors A to D, timing, such as exposure timing and electronic shutter timing for controlling an exposure period, is input from the TG 104. In the present exemplary embodiment, the scanning direction 206 represents a direction parallel to a unit (a row, for example) for the collective exposure and readout to be performed by each of the imaging sensors A to D.

When the exposure is completed, signal readout for each line sequentially starts as with the exposure timing. First, readout (Y11) for the first line of the imaging sensor A is performed, and data obtained by this readout is stored into the memory circuit 111 as S1-L1, i.e., as first line data of the imaging sensor A. Similarly, readout (Y21) for the first line of the imaging sensor B is performed, and data obtained by this readout is stored into the memory circuit 111 as S2-L1, i.e., as first line data of the imaging sensor B. Readout (Y31) for the first line of the imaging sensor C is performed, and data obtained by this readout is stored into the memory circuit 111 as S3-L1, i.e., as first line data of the imaging sensor C. Readout (Y41) for the first line of the imaging sensor D is performed, and data obtained by this readout is stored into the memory circuit 111 as S4-L1, i.e., as first line data of the imaging sensor D.

Afterward, similar readout and storage continue for the remaining each line in each of the imaging sensors A to D, until an nth line that is the last line is processed. An image 202 of the imaging sensor A, an image 203 of the imaging sensor B, an image 204 of the imaging sensor C, and an image 205 of the imaging sensor D are generated by these processing steps.

Next, in the present exemplary embodiment, an image, which is generated based on the images obtained by the exposure and the readout illustrated in FIG. 2, will be described with reference to FIG. 3.

In the present exemplary embodiment, the signals output from the imaging sensors A to D are arranged in a panoramic form and combined by the image processing circuit 105. FIG. 3 illustrates an example in which a composite image of a wide angle of view is displayed on a device such as a display unit of the client apparatus 2000. The composite image (an image of a wider image-capture area) is obtained by arranging the images generated by the imaging sensors A to D in a panoramic form. The arrangement may be performed by placing the individual images side-by-side according to their spatial order as provided by the positions of the corresponding imaging units.

Figure 2:
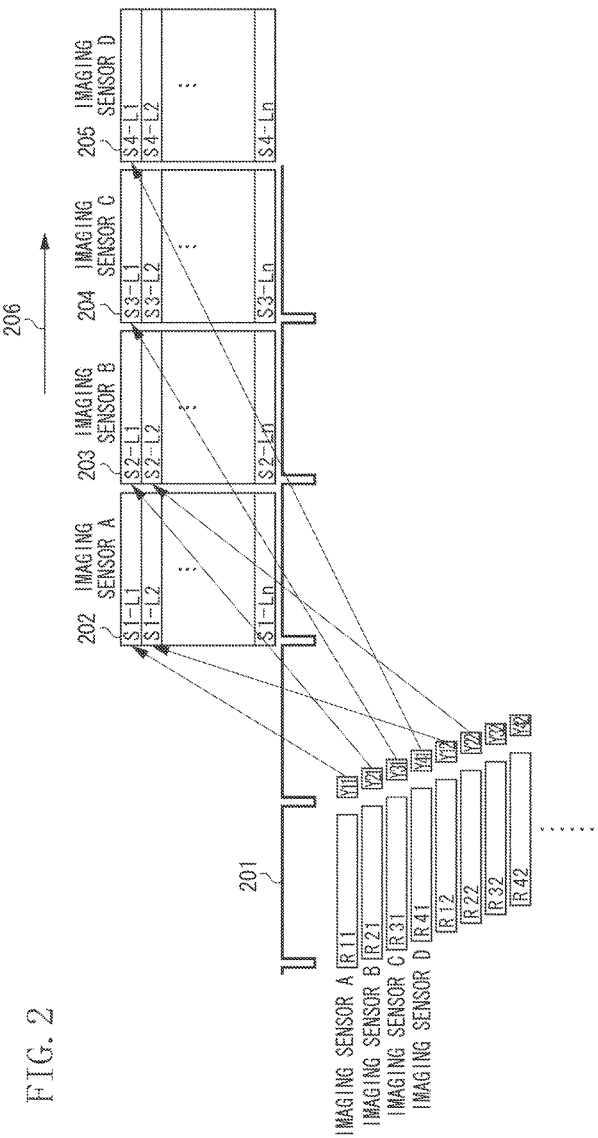
FIG. 2 is a timing chart illustrating exposure and readout of a plurality of imaging sensors according to the first exemplary embodiment.
Figure 3:
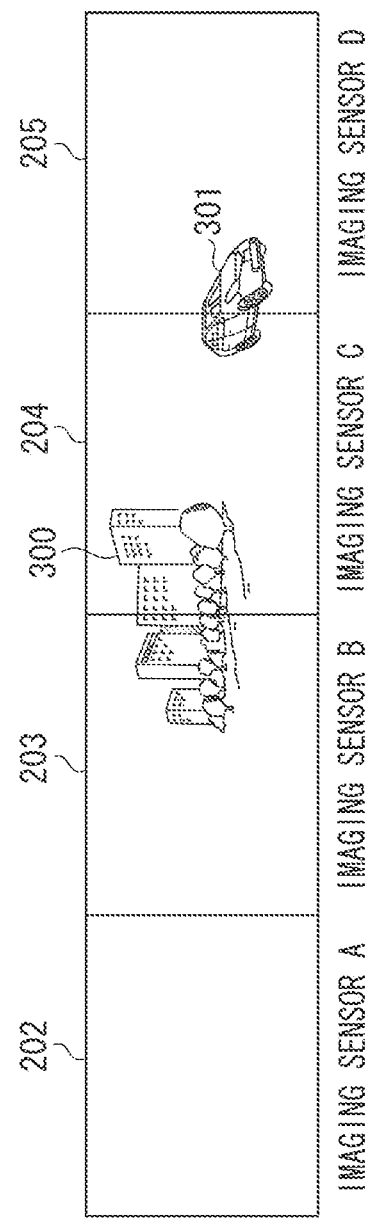
FIG. 3 is a diagram illustrating an image obtained by combining images generated by the plurality of imaging sensors according to the first exemplary embodiment.

In the present exemplary embodiment, as illustrated in FIG. 2, the exposure and the readout of the imaging sensors A to D are performed by being switched line by line of each of the imaging sensors A to D. Therefore, a still subject 300 such as a building straddling a part between the imaging sensors B and C, i.e., a part connecting the images 203 and 204, is not greatly affected by a time lag between the imaging sensors B and C, and thus is subjected to the composition as it is. Meanwhile, for a moving subject 301 straddling a part between the imaging sensors C and D, a time lag between the imaging sensors C and D causes a displacement, but this displacement is small because the exposure and the readout are performed by being switched line by line. Therefore, the moving subject can also be subjected to the composition, without appearing double. Since this subject does not appear double, the subject can be detected as one object, without being incorrectly detected as two objects.

In this way, when image capture is performed by using the imaging units including the imaging sensors A to D, respectively, which each perform exposure and readout line by line, the exposure and the readout are sequentially performed for the imaging sensors A to D adjacent in the scanning direction 206, as illustrated in FIG. 2. Such operation can suppress a displacement of a subject straddling a part connecting images. In other words, it is possible to reduce incorrect detection that may occur when a subject straddling a part connecting images becomes double.

In the present exemplary embodiment, the scanning direction 206 and the arrangement of the imaging sensors A to D are described to be parallel to each other. However, imaging sensors arranged in a direction perpendicular to the scanning direction 206 may be adopted. In this case, an effect similar to that of the present exemplary embodiment can be obtained by performing the operation according to the present exemplary embodiment, in the imaging sensors arranged in the direction perpendicular to the scanning direction 206.

In the example illustrated in FIG. 2, the rows corresponding to the respective imaging sensors A to D are sequentially read out. However, the exposure timing or readout timing may be simultaneous for each corresponding row. For example, a start position or end position may be the same for each of the timing of exposure R1n to the timing of exposure R4n, which respectively correspond to the nth rows of the respective imaging sensors. Further, the exposure timing or readout timing may be simultaneous for each corresponding row, by a unit formed of two or more rows. For example, a start position or end position may be the same for the timing of exposure R1n and the timing of exposure R1n+1 in an nth row and an n+1th row, respectively, for each imaging sensor. In this way, the unit for the simultaneous timing is not limited to one row, and may be determined considering factors such as a pixel arrangement and an internal structure of the imaging sensor, so that driving based on appropriate timing can be performed.

Figure 4:
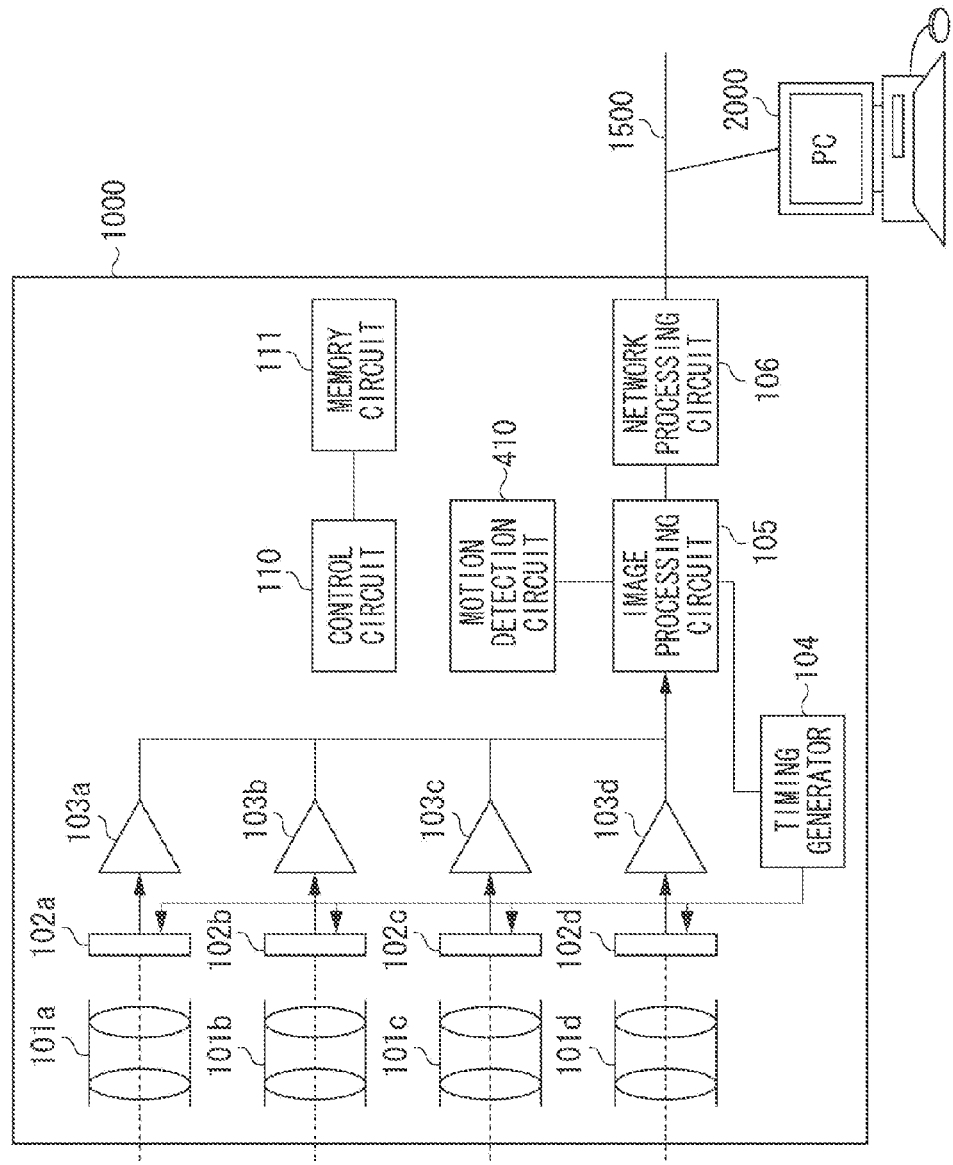
FIG. 4 is a diagram illustrating a system configuration according to a second exemplary embodiment.

FIG. 4 is a diagram illustrating a system configuration including an imaging apparatus 1000 according to a second exemplary embodiment. Configurations similar to those of the first exemplary embodiment use the same reference numerals as those thereof and therefore will not be described.

In the present exemplary embodiment, a motion detection circuit 410 is provided. The motion detection circuit 410 detects the presence or absence of a moving subject, in image data input into an image processing circuit 105, or image data representing a composite image formed of a plurality of images combined by the image processing circuit 105. A control circuit 110 changes a driving mode for driving each of imaging sensors 102a to 102d, by controlling a TG 104, based on the presence or absence of a moving subject according to a detection result of the motion detection circuit 410.

More specifically, when the motion detection circuit 410 detects a moving subject in the image data (image), each of the imaging sensors 102a to 102d is driven in the driving mode described in the first exemplary embodiment. On the other hand, when the motion detection circuit 410 detects no moving subject in the image data, image data is acquired by driving each of the imaging sensors 102a to 102d in a driving mode illustrated in FIGS. 5 and 6.

Here, operation for performing exposure and readout of a plurality of imaging sensors according to the second exemplary embodiment will be described using a timing chart of FIG. 5. The description will be provided using a case where the motion detection circuit 410 detects no moving subject in image data.

Figure 5:
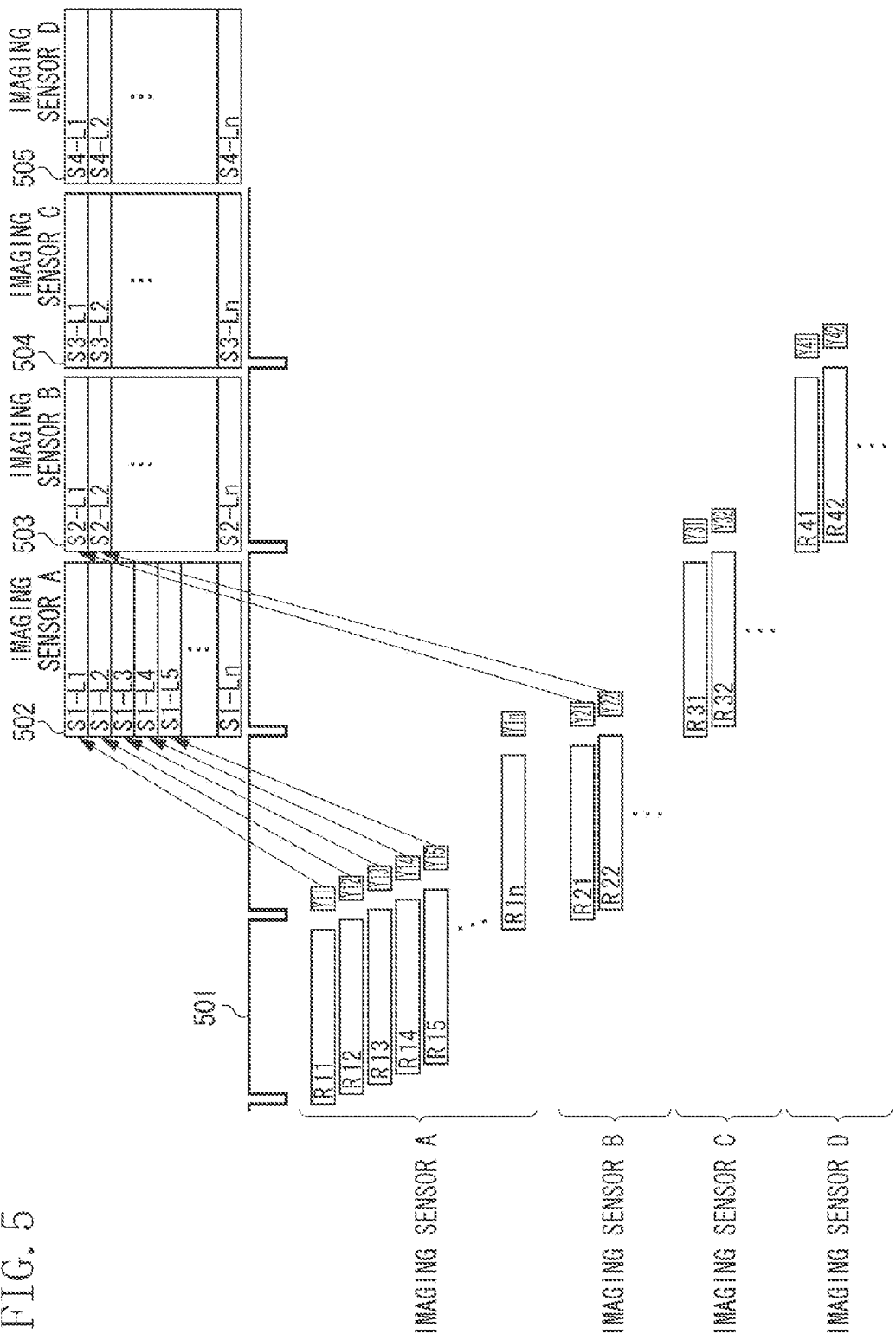
FIG. 5 is a timing chart illustrating exposure and readout of a plurality of imaging sensors according to the second exemplary embodiment.

FIG. 5 is a diagram illustrating timings of readout and storage for the arranged imaging sensors.

A vertical synchronizing signal 501 is generated by the TG 104, and then input into each of imaging sensors A to D (102a to 102d), as a reference signal for synchronization of driving timing for the imaging sensors A to D. The imaging sensors A to D each perform processing based on the timing of a fall of the vertical synchronizing signal 501. In FIG. 5, exposure and readout of each row may be executed based on timing according to a horizontal synchronization signal not illustrated.

Exposure (R11) for a first line of the first imaging sensor A starts first. Exposure (R12) for a second line of the first imaging sensor A starts next. Each subsequent exposure sequentially starts, and eventually, exposure (R1n) for an nth line that is the last line (an effective region) starts.

When the exposure is completed, signal readout for each line sequentially starts (Y11 to Y1n), as with the exposure timing. Data of each line (S1-L1 to S1-Ln) obtained by the readout is stored as data of each line of the imaging sensor A. An image 502 of the imaging sensor A is generated based on these pieces of data.

Similar exposure and readout are performed in each of the second imaging sensor B, the third imaging sensor C, and the fourth imaging sensor D, so that images 503 to 505 are generated.

Figure 6:
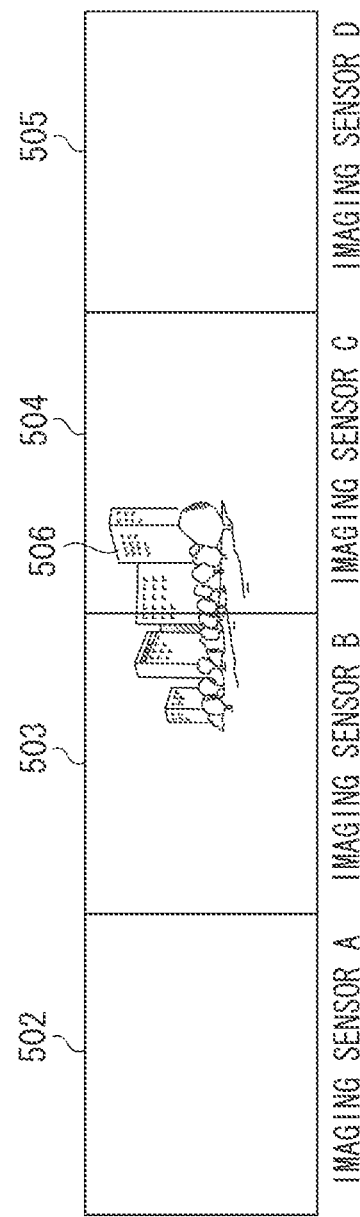
FIG. 6 is a diagram illustrating an image obtained by combining images generated by the plurality of imaging sensors according to the second exemplary embodiment.

Next, in the present exemplary embodiment, an image generated based on the images 502 to 505 resulting from the exposure and the readout illustrated in FIG. 5 will be described with reference to FIG. 6.

In the present exemplary embodiment, similarly, signals output from the imaging sensors A to D are arranged in a panoramic form and combined by the image processing circuit 105. FIG. 6 illustrates an example in which a composite image of a wide angle of view is displayed on a device such as a display unit of a client apparatus 2000. The composite image is obtained by arranging the images generated by the imaging sensors A to D in a panoramic form. The arrangement may be performed by placing the individual images side-by-side according to their spatial order as provided by the positions of the corresponding imaging units.

Here, the exposure and the readout of the imaging sensors A to D are performed by being switched for each of the imaging sensors A to D. A still subject 506 straddling a part between the imaging sensors B and C is not affected by a time lag between the imaging sensors B and C, and thus is displayed without any influence of a displacement.

When image capture is performed by such switching for each of the imaging sensors A to D, electric power is readily saved for each of the imaging sensors A to D, for example, by limiting a monitoring area by stopping some of the imaging units, or by changing the driving mode. For example, images may be obtained by operating only predetermined imaging units, so that some of images displayed in a panoramic form can be updated.

Next, an operation for changing the exposure timing and the readout timing based on the presence or absence of a moving subject will be described with reference to a flowchart of FIG. 7. The control circuit 110 executes processing of this flowchart.

In step S701, the control circuit 110 starts the processing of this flowchart. The processing then proceeds to step S702.

In step S702, the control circuit 110 controls the TG 104, thereby driving each of the imaging sensors 102a to 102d. Some or all pieces of the image data (images) acquired by the respective imaging units are input into the image processing circuit 105. The processing then proceeds to step S703.

In step S703, the control circuit 110 detects whether a moving subject is present in the image data input into the image processing circuit 105, by using the motion detection circuit 410. Here, the detection of a moving subject is performed by associating the same subjects based on a difference between images, and detecting the presence or absence of a motion based on a movement amount between the images of the subject. The movement amount can be detected by determining a difference between images by moving the one of the images relative to the other image in a predetermined direction. A database may be provided in a component such as a memory circuit 111, and a result of detection such as face detection using the database may be used. Further, the presence or absence of a moving subject may be detected based on whether a position, in which detection such as face detection is performed, is changed between images. The detection may be performed based on control or information from the client apparatus 2000. Here, if the control circuit 110 detects no moving subject (NO in step S703), the processing proceeds to step S704. If the control circuit 110 detects a moving subject (YES in step S703), the processing proceeds to step S705.

In step S704, the control circuit 110 controls the TG 104, thereby controlling each of the imaging sensors 102a to 102d to be driven in the driving mode illustrated in FIG. 5. The processing then proceeds to step S706.

In step S705, the control circuit 110 controls the TG 104, thereby controlling each of the imaging sensors 102a to 102d to be driven in the driving mode illustrated in FIG. 2. The processing then proceeds to step S706.

In step S706, the control circuit 110 causes the image processing circuit 105 to perform panoramic composition by arranging the pieces of image data obtained by the exposure and the readout by the imaging sensors 102a to 102d. The processing then proceeds to step S707.

In step S707, the control circuit 110 performs control for outputting image data generated by the image processing circuit 105 to a network processing circuit 106, to transmit the output image data to the client apparatus 2000 via a network 1500. In step S708, the control circuit 110 ends the processing of this flowchart.

Appropriate image capture can be achieved by performing the above-described operation, specifically, by switching the driving modes corresponding to the exposure and readout timing in the imaging sensors 102a to 102d, based on the presence or absence of a moving subject in the image data acquired by each of the imaging sensors 102a to 102d. In the present exemplary embodiment, the control circuit 110 corresponds to a switching unit that switches a plurality of driving modes.

In the present exemplary embodiment, the driving modes are switched based on the presence or absence of a moving subject in an image. However, the driving modes may be switched also considering the position of the moving subject in the image in the detection by the motion detection circuit 410. Specifically, the driving modes may be switched considering whether the moving subject is detected in a region straddling a part connecting images. In other words, even if a moving subject is detected in step S703 in FIG. 7, an image displacement is suppressed if the moving subject is detected near the center of the image, and a possibility of incorrect detection is suppressed as well. Thus, the frequency of switching the driving modes can be reduced, by switching the driving modes when a moving subject is detected on the periphery of the image. Further, it may be determined that a moving subject is detected in a region straddling a part connecting images, if a motion is detected in two or more adjacent imaging sensors.

The motion detection circuit 410 is described to detect only the presence or absence of a moving subject in an image, but may also detect an amount of movement and a direction of movement of the moving subject. In this case, a predetermined threshold may be provided for detection of the amount of movement, so that a small amount of movement is not detected. Incorrect switching of the driving modes due to incorrect detection can be reduced by thus providing the predetermined threshold for the amount of movement. In addition, whether a moving subject extends to a range to be captured in the next image capture can be determined by using the direction of movement of the moving subject. A fast-moving subject can be appropriately followed by thus using the direction of movement of the moving subject in the detection.

In the present exemplary embodiment, the operation for switching the driving modes of each of the imaging sensors is performed based on the presence or absence of a moving subject. However, it is not necessary to switch the driving modes for all of the imaging sensors. In other words, the driving modes of some of the imaging sensors may be switched according to the region of the detected moving subject. For example, only the driving modes of the imaging sensors, which capture a subject straddling a part between image-capture ranges, may be switched.

Figure 7:
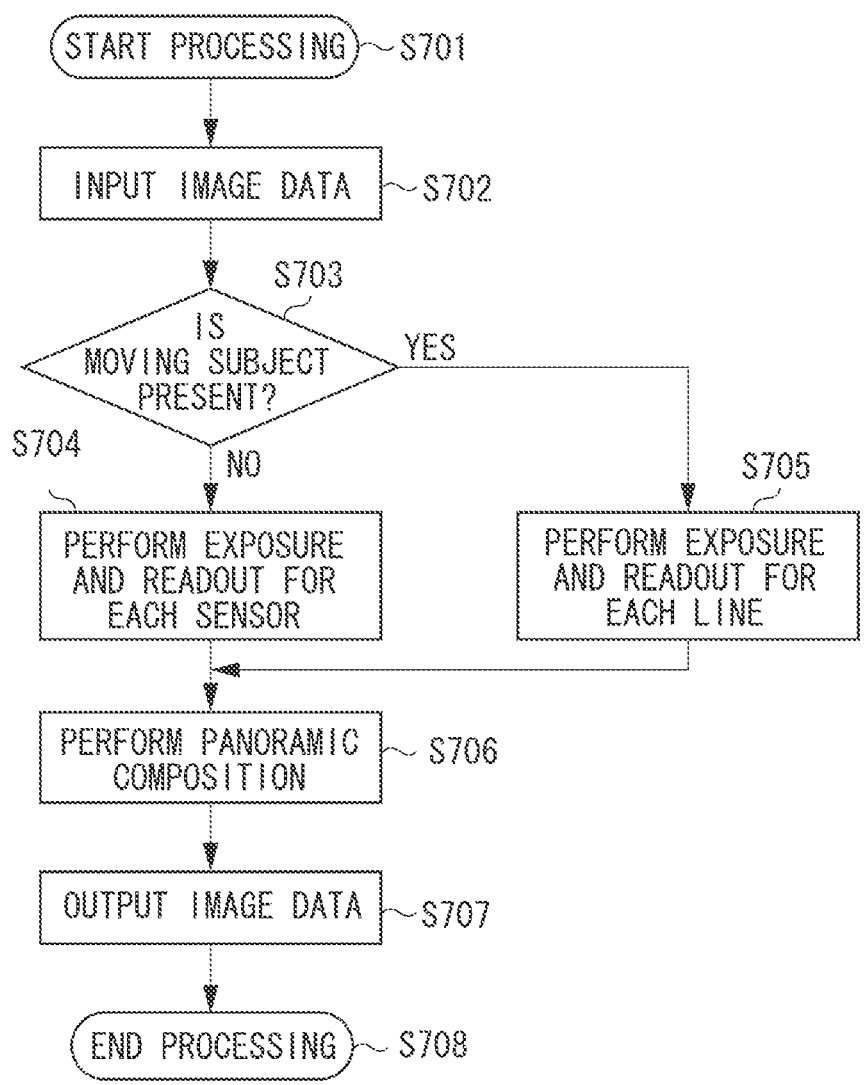
FIG. 7 is a flowchart illustrating an operation flow according to the second exemplary embodiment.

The flowchart illustrated in FIG. 7 may be executed when image capture starts, or may be executed at predetermined intervals.

The exemplary embodiments are each described to employ the configuration having the four lenses and the four imaging sensors, but the number of the lenses and the number of the imaging sensors may each be two or three, or five or more.

Although the exemplary embodiments of the disclosure are described above, the disclosure is not limited to these exemplary embodiments, and may be variously altered and modified within the scope of the gist thereof.

(Exemplary Embodiment Concerning Network Communication)

The imaging apparatus 1000 according to each of the exemplary embodiments is connected to the client apparatus 2000 via the network 1500. The client apparatus 2000 can transmit, via the network 1500, a control command for controlling the imaging apparatus 1000 via the network 1500. The imaging apparatus 1000 controls itself based on the received control command and parameters included in the control command. When receiving the control command, the client apparatus 2000 transmits a response to the received command, to the imaging apparatus 1000. When receiving the response from the imaging apparatus 1000, the client apparatus 2000 updates the contents of a user interface displayed on a device such as the display unit provided in the client apparatus 2000, based on information included in the response.

Figure 8:
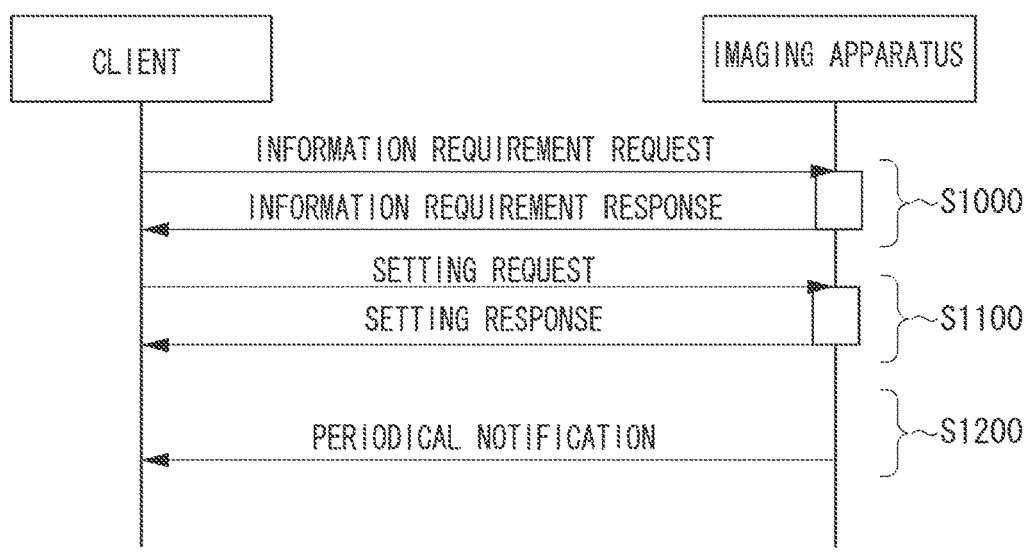
FIG. 8 is a diagram illustrating communication according to a control command in an exemplary embodiment.

Here, communication according to the control command between the imaging apparatus 1000 and the client apparatus 2000 will be described with reference to FIG. 8. The client apparatus 2000 and the imaging apparatus 1000 perform the communication using a transaction that is a combination of a request and a response.

First, in transaction S1000, the client apparatus 2000 transmits an information requirement request for acquiring information held by the imaging apparatus 1000. The information requirement request may include, for example, an inquiry about a function of the imaging apparatus 1000. Here, the function of the imaging apparatus 1000 includes, for example, a parameter for image compression and encoding, an image correction function, and the presence or absence of a panning tilting mechanism. The function of the imaging apparatus 1000 also includes driving mode information about the driving mode in the imaging unit. Here, the driving mode information includes, for example, the type of the above-described driving mode in which the imaging sensor can be driven. The imaging apparatus 1000 then transmits an information requirement response, as a response to this information requirement request. The information requirement response includes information about the function of the imaging apparatus 1000 requested from the client apparatus 2000. By using such information, the client apparatus 2000 can recognize the function of the imaging apparatus 1000.

The client apparatus 2000 can also acquire the state of the imaging apparatus 1000 by using the information requirement request. Here, the state of the imaging apparatus 1000 includes, for example, the present control parameter, and the position of the panning tilting mechanism. The state of the imaging apparatus 1000 also includes, for example, the state of the present driving mode. The client apparatus 2000 can recognize the state of the imaging apparatus 1000, by using these pieces of information.

Next, in transaction S1100, the client apparatus 2000 transmits a setting request for setting information such as various parameters, to the imaging apparatus 1000. The setting request is determined considering the function or state of the imaging apparatus 1000 acquired beforehand in transaction S1000. For example, a request for setting a state of the imaging apparatus 1000 can be included. Here, the setting request allows, for example, setting of a parameter for image compression and encoding, setting of the image correction function, and operation of the panning tilting mechanism. The driving mode of the imaging unit can also be set by this setting request.

The imaging apparatus 1000 then transmits a setting response, as a response to this setting request. The setting response includes information about, for example, whether normal setting is made for, for example, the function of the imaging apparatus 1000 set from the client apparatus 2000. The client apparatus 2000 can recognize the state of the imaging apparatus 1000 by using these pieces of information.

Next, in transaction S1200, based on the setting from the client apparatus 2000, the imaging apparatus 1000 transmits a periodical notification to the client apparatus 2000, when triggered by a periodical or predetermined event. The periodical notification includes contents similar to the contents included in the information requirement response. The client apparatus 2000 can recognize the state of the imaging apparatus 1000 by using these pieces of information.

The disclosure can also be implemented by such processing that a program that implements one or more functions of the above-described exemplary embodiments is supplied to a system or apparatus via a network or storage medium, and one or more processors in the system or apparatus read the program and then execute the read program. Moreover, the disclosure can also be implemented by a circuit (e.g., an application-specific integrated circuit (ASIC)) that implements one or more functions.

Other Embodiments

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s) of the disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-055210, filed Mar. 18, 2015, which is hereby incorporated by reference herein in its entirety.

What is claimed is:

1. An imaging apparatus comprising:
a plurality of imaging units each provided to acquire image data by capturing an image of a subject with line scan control; and
a driving unit configured to drive at least one imaging unit as a driving target among the plurality of imaging units, in predetermined driving modes,
wherein the imaging units have at least first and second imaging sensors, each imaging sensor including photoelectric converters for converting light into an electrical signal arranged in rows and columns,
wherein the driving unit includes a selection unit that selects a region in the image sensor in a unit used for the line scan control, for storing the image data corresponding to the selected region in a memory, as a first unit formed of one or more rows of the imaging sensor, and
wherein the driving modes include a first driving mode in which the at least first and second imaging sensors in the imaging unit serving as the driving target are sequentially switched, for each exposure or readout of the first unit selected by the selection unit.

2. The imaging apparatus according to claim 1, further comprising a combining unit configured to combine a plurality of pieces of image data acquired by the imaging units, wherein the combining unit combines the acquired pieces of image data, thereby generating image data representing an imaging range wider than a range of imaging by each one of the imaging units.

3. The imaging apparatus according to claim 2, further comprising:
a detection unit configured to detect a subject motion in the image data; and
a switching unit configured to switch the driving modes of the driving unit,
wherein the switching unit switches the driving modes of the driving unit, based on a detection result of the detection unit.

4. The imaging apparatus according to claim 3,
wherein the selection unit selects a region different from the region corresponding to the first unit, as a second unit,
wherein the driving modes include a second driving mode in which the imaging unit serving as the driving target is switched, for each exposure or readout of the second unit selected by the selection unit, and
wherein the switching unit switches at least between the first driving mode and the second driving mode.

5. The imaging apparatus according to claim 4, wherein the region included in the second unit is wider than the region included in the first unit.

6. The imaging apparatus according to claim 5, wherein the second unit includes a range of an effective region for acquiring the image data.

7. The imaging apparatus according to claim 3, wherein the switching unit performs switching to the first driving mode in a case where the detection unit detects a subject motion in the image data, and performs switching to the second driving mode in a case where the detection unit detects no subject motion in the image data.

8. The imaging apparatus according to claim 1, further comprising a notification unit configured to communicate with an external apparatus via a network by using a transaction that is a combination of a request and a response and to notify the external apparatus of a state of the imaging apparatus via the network, wherein the notification unit notifies the external apparatus of information about the driving mode of the imaging apparatus.

9. The imaging apparatus according to claim 8,
wherein the notification unit receives a control command from the external apparatus via the network, and
wherein the switching unit switches the driving modes, based on the control command.

10. A control method comprising:
acquiring image data by capturing an image of a subject using each of a plurality of imaging units in an imaging apparatus with line scan control; and
driving at least one imaging unit as a driving target among the plurality of imaging units, in predetermined driving modes,
wherein the imaging units have at least first and second imaging sensors, each imaging sensor including photoelectric converters for converting light into an electrical signal arranged in rows and columns,
wherein the driving includes selecting a region in the image sensor in a unit used for the line scan control, for storing the image data corresponding to the selected region in a memory, as a first unit formed of one or more rows of the imaging sensor, and
wherein the driving modes include a first driving mode in which the at least first and second imaging sensors in the imaging unit serving as the driving target are sequentially switched, for each exposure or readout of the first unit selected in the selecting.

* * * * *